US012657861B2

(12) United States Patent
Park et al.

(10) Patent No.: US 12,657,861 B2
(45) Date of Patent: Jun. 16, 2026

(54) METHOD FOR TRAINING AN OBJECT RECOGNITION MODEL IN A COMPUTING DEVICE

(71) Applicant: HANWHA TECHWIN CO., LTD., Seongnam-si (KR)

(72) Inventors: Sungyeon Park, Seongnam-si (KR); Hyunhak Shin, Seongnam-si (KR); Changho Song, Seongnam-si (KR); Seungin Noh, Seongnam-si (KR); Jeongeun Lim, Seongnam-si (KR)

(73) Assignee: Hanwha Vision Co., Ltd., Seongnam-si (KR)

( * ) Notice: Subject to any disclaimer, the term of this patent is extended or adjusted under 35 U.S.C. 154(b) by 531 days.

(21) Appl. No.: 18/097,532

(22) Filed: Jan. 17, 2023

(65) Prior Publication Data

US 2023/0386164 A1    Nov. 30, 2023

(30) Foreign Application Priority Data

May 25, 2022    (KR) ........................ 10-2022-0064081

(51) Int. Cl.
*G06K 9/00* (2022.01)
*G06V 10/25* (2022.01)
*G06V 10/774* (2022.01)

(52) U.S. Cl.
CPC ............ *G06V 10/25* (2022.01); *G06V 10/774* (2022.01)

(58) Field of Classification Search
CPC ................................ G06V 10/25; G06V 10/82
See application file for complete search history.

(56) References Cited

U.S. PATENT DOCUMENTS 11,971,955 B1 *    4/2024    Chakraborty ....... G06F 3/04845
2019/0080196 A1    3/2019    Choi et al.
(Continued)

FOREIGN PATENT DOCUMENTS

CN    113011210 A  *  6/2021    .......... H04N 19/124

OTHER PUBLICATIONS

European Search Report dated Sep. 12, 2023 for European Application No. 23151976.0-1224.
(Continued)

*Primary Examiner* — Molly Wilburn
*Assistant Examiner* — Aidan Keup
(74) *Attorney, Agent, or Firm* — McLean IP Global; Jason Y. Pahng

(57) ABSTRACT

An object recognition model training method in a computing device is disclosed. In the present disclosure, an object of interest, which is an object for object recognition, is designated, and an object of non-interest excluding the object of interest is generated and used as learning data for the object recognition model. In the process of training the object recognition model, when an erroneously detected object occurs, the object recognition model may be retrained by automatically converting the erroneously detected object to the object of non-interest without feedback of the erroneous detection to the user. Accordingly, user convenience for processing the erroneously detected object is improved, which increases reliability of the object recognition model. This disclosure can be associated with artificial intelligence modules, drones (unmanned aerial vehicles (UAVs)), robots, augmented reality (AR) devices, virtual reality (VR) devices, devices related to 5G service, etc.

13 Claims, 8 Drawing Sheets

(56) References Cited

U.S. PATENT DOCUMENTS

| | | |
|---|---|---|
| 2021/0004589 A1 | 1/2021 | Turkelson et al. |
| 2022/0392209 A1* | 12/2022 | Bossard ............... G06V 10/987 |
| 2023/0078218 A1* | 3/2023 | Wang .................... G06N 3/098 |
| | | 706/12 |

OTHER PUBLICATIONS

Bingyi Kang et al., "Few-shot Object Detection via Feature Reweighting", 1019 IEEE/CVF International Conference on Computer Vision (ICCV), IEEE, Oct. 27, 2019, pp. 8419-8428.

* cited by examiner

1

METHOD FOR TRAINING AN OBJECT RECOGNITION MODEL IN A COMPUTING DEVICE

CROSS-REFERENCE TO RELATED APPLICATIONS

This application is based on and claims priority under 35 U.S.C. § 119 to Korean Patent Application No. 10-2022-0064081, filed on May 25, 2022, in the Korean Intellectual Property Office, the disclosure of which is incorporated by reference herein in its entirety.

BACKGROUND

The present disclosure relates to a method for training an object recognition model in a computing device.

There are various learning-based image analysis techniques which have been learned to detect an object in an image and determine the existence of the object, and to classify the object and output the type of the object if the object exists.

AI (Artificial Intelligence)-based object detection technology may require considerable resources in the process of classifying new object types, collecting object information of new objects, and learning models. In particular, in the process of training a model for object recognition, a process of re-learning by reflecting an erroneously detected object may be necessary to increase the reliability of the model. However, there is a problem in that it is difficult to immediately correct the result through monitoring of the object detection result, and the process of manually indexing the erroneously detected object in the model training process may also be a process that takes considerable resources and time.

SUMMARY

In view of the above, the present disclosure provides a method for training an object recognition model which is capable of increasing the reliability of the object recognition model by automatically correcting an erroneously detected object in a process of implementing the AI learning model for object recognition and re-training the model by reflecting it in real time.

The objects to be achieved by the present disclosure are not limited to the above-mentioned objects, and other objects not mentioned may be clearly understood by those skilled in the art from the following description.

An object recognition model training method in a computing device, according to one embodiment of the present disclosure, includes receiving an input for designating an object of interest in an image acquired through a camera; generating an object of non-interest by designating at least a portion of a region excluding the object of interest in the image; training an object recognition model based on the object of interest and the object of non-interest; when a first object not designated as the object of interest is recognized as a result of performing object recognition based on the trained object recognition model, changing the first object to the object of non-interest; and retraining the object recognition model based on the changed object of non-interest.

The receiving of the input for designating the object of interest may include extracting location information of the object of interest as the object of interest is designated.

The generating of the object of non-interest may include generating N number of sets of objects of non-interest with different attributes, and the N number of sets of object of non-interest may include a first set of object of non-interests randomly designated in a region excluding the object of interest by a processor of the computing device and a plurality of second sets of object of non-interest generated while, among grid regions obtained by dividing the image at a predetermined grid interval, changing the grid interval in a region excluding the object of interest.

The plurality of second sets of object of non-interest may include a plurality of pixel regions designated in a state in which the grid interval is adjusted to a first grid interval, and a plurality of pixel regions designated in a state in which the grid interval is adjusted to a second grid interval.

In the training of the object recognition model, each of N number of object recognition models may be trained by using the object of interest and each of the N number of sets of object of non-interest as a pair of training data.

In the generating of the object of non-interest, the object of non-interest is additionally designated when a confidence score in a region excluding the object of interest is similar to the object of interest within a predetermined range, based on the confidence score of a previous training model in a process of repeatedly performing the training of the object recognition model.

The changing of the first object to the object of non-interest may include: acquiring object characteristic information of the first object; and selecting a second object to be changed to the object of non-interest based on the object characteristic information of the first object from among objects not generated as the object of non-interest, and additionally changing the second object to the object of non-interest.

The object recognition model training method may further include changing and displaying a visual characteristic of a bounding box of the object changed to the object of non-interest.

A computing device according to another embodiment of the present disclosure includes: a communication unit that receives an image acquired through a camera; a user input unit that designates an object of interest in the image; and a processor that generates an object of non-interest by designating at least a portion of a region excluding the object of interest in the image, and trains an object recognition model based on the object of interest and the object of non-interest, wherein in case that a first object not designated as the object of interest is recognized as a result of performing object recognition based on the trained object recognition model, the processor changes the first object to the object of non-interest and retrains the object recognition model based on the changed object of non-interest.

The processor may extract location information of a bounding box of the object of interest as the object of interest is designated.

The processor generates N number of sets of object of non-interest having different attributes, and the N number of sets of object of non-interests may include a first set of object of non-interests randomly designated in a region excluding the object of interest by the processor of the computing device, and a plurality of second sets of object of non-interests generated while, among grid regions obtained by dividing the image at a predetermined grid interval, changing the grid interval in a region excluding the object of interest.

The processor may generate a plurality of pixel regions designated in a state in which the grid interval is adjusted to a first grid interval and a plurality of pixel regions designated in a state in which the grid interval is adjusted to a second grid interval as the second sets of objects of non-interest, respectively.

Based on a confidence score of a previous training model in a process of repeatedly performing the training of the object recognition model, the processor may additionally designate the object of non-interest when the confidence score in a region excluding the object of interest is similar to the object of interest within a predetermined range.

The processor may acquire object characteristic information of the first object, select a second object to be changed to the object of non-interest based on the object characteristic information of the first object among objects not generated as the object of non-interest, and additionally change the second object to the object of non-interest.

The processor may change and display a visual characteristic of a bounding box of the object changed to the object of non-interest.

A computing device according to another embodiment of the present disclosure include: an input unit configured to receive a user input for designating an object of interest in a first image acquired through a camera; and a processor that extracts location information of the object of interest and automatically performs iterative learning based on the location information of the object of interest to train an object recognition model, wherein the processor randomly generates location information of an object of non-interest in the first image, applies the generated location information to the object recognition model to perform a first learning, and additionally performs learning N times after the first learning to, in each learning, automatically extract the location information of erroneously detected object based on a previous learning result and change the erroneously detected object to an object of non-interest.
further comprising a display unit, A computing device may further comprise a display unit, wherein the processor may change visual characteristics of the object of interest detected in the process of performing the iterative learning to display the changed visual characteristics on the display unit, and apply the location information of the erroneously detected object in the next iterative learning while the erroneously detected object is not displayed through the display unit.

Wherein the processor may determine whether the erroneously detected object exists according to an intersection over union (IoU) value of the object of interest designated through the user input and an object recognition result of the trained object recognition model.

Wherein the processor may add the location information of the erroneously detected object changed to the object of non-interest as learning data of the object recognition model to re-train the object recognition model.

Wherein the processor may add the location information of the erroneously detected objects changed to the object of non-interest, which satisfies a predetermined condition, as learning data of the object recognition model to re-train the object recognition model.

Wherein the processor may terminate the iterative learning and stores the object recognition model when there is no erroneous detection as a result of recognizing objects in the first image based on the object recognition model after the N-th learning has been performed.

According to the object recognition model learning method in accordance with one embodiment of the present disclosure, the reliability of the object recognition model can be increased by automatically correcting an erroneously detected object in the process of implementing an AI (artificial intelligence) training model for object recognition and re-training the model by reflecting it in real time.

The effects to be achieved by the present disclosure are not limited to the above-mentioned effects, and other effects not mentioned may be clearly understood by those skilled in the art from the following description.

BRIEF DESCRIPTION OF THE DRAWINGS

The accompanying drawings, which are included as part of the detailed description to help the understanding of the present disclosure, provide embodiments of the present disclosure, and explain the technical features of the present disclosure together with the detailed description.

DETAILED DESCRIPTION

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Figure 1:
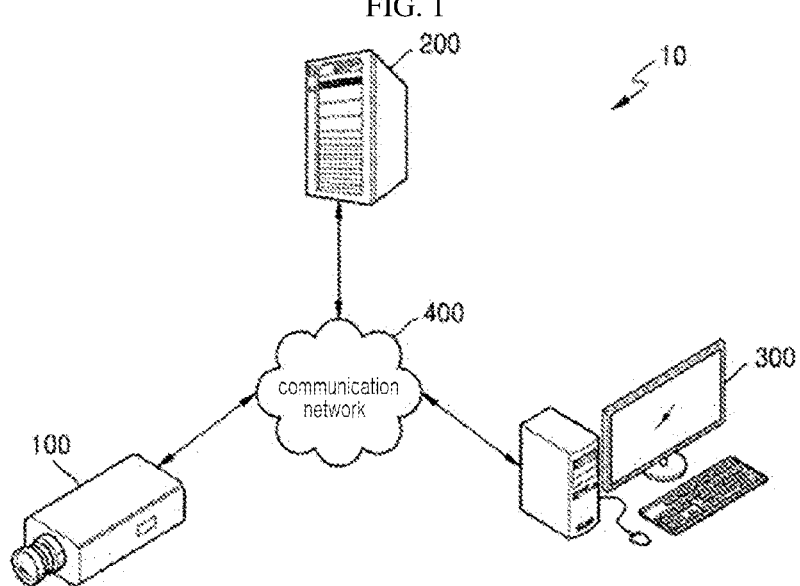
FIG. 1 is a diagram for describing a surveillance camera system, for recognizing an object and utilizing the result, to which an object recognition model trained according to one embodiment of the present disclosure is applied.

FIG. 1 is a diagram for describing a surveillance camera system, for recognizing an object and utilizing the result, to which an object recognition model trained according to one embodiment of the present disclosure is applied.

Referring to FIG. 1, a surveillance camera system 10 according to one embodiment of the present disclosure may include an image capture device 100 and an image management server 200. The image capture device 100 may be an electronic imaging device disposed at a fixed location in a specific place, may be an electronic imaging device that can be moved automatically or manually along a predetermined path, or may be an electronic imaging device that can be moved by a person or a robot. The image capture device 100 may be an IP (Internet protocol) camera connected to the wired/wireless Internet and used. The image capture device 100 may be a PTZ (pan-tilt-zoom) camera having pan, tilt, and zoom functions. The image capture device 100 may have a function of recording a monitored area or taking a picture. The image capture device 100 may have a function of recording a sound generated in a monitored area. When a change such as movement or sound occurs in the monitored area, the image capture device 100 may have a function of generating a notification or recording or photographing. The image capture device 100 may receive and store the trained object recognition learning model from the image management server 200. Accordingly, the image capture device 100 may perform an object recognition operation using the object recognition learning model.

The image management server 200 may be a device that receives and stores an image as it is captured by the image capture device 100 and/or an image obtained by editing the image. The image management server 200 may analyze the received image to correspond to the purpose. For example, the image management server 200 may detect an object in the image using an object detection algorithm. An AI-based algorithm may be applied to the object detection algorithm, and an object may be detected by applying a pre-trained artificial neural network model.

Meanwhile, the image management server 200 may store various learning models suitable for the purpose of image analysis. In addition to the above-described learning model for object detection, a model capable of acquiring object characteristic information that allows the detected object to be utilized may be stored. The image management server 200 may perform an operation of training the learning model for object recognition described above.

Meanwhile, the model for object recognition may be trained in the above-described image management server 200 and transmitted to the image capture device 100, but training of the object recognition model and re-training of the model are performed in the image capture device 100.

In addition, the image management server 200 may analyze the received image to generate metadata and index information for the corresponding metadata. The image management server 200 may analyze image information and/or sound information included in the received image together or separately to generate metadata and index information for the metadata.

The surveillance camera system 10 may further include an external device 300 capable of performing wired/wireless communication with the image capture device 100 and/or the image management server 200.

The external device 300 may transmit an information provision request signal for requesting to provide all or part of an image to the image management server 200. The external device 300 may transmit an information provision request signal to the image management server 200 to request whether or not an object exists as the image analysis result. In addition, the external device 300 may transmit, to the image management server 200, metadata obtained by analyzing an image and/or an information provision request signal for requesting index information for the metadata.

The surveillance camera system 10 may further include a communication network 400 that is a wired/wireless communication path between the image capture device 100, the image management server 200, and/or the external device 300. The communication network 400 may include, for example, a wired network such as LANs (Local Area Networks), WANs (Wide Area Networks), MANs (Metropolitan Area Networks), ISDNs (Integrated Service Digital Networks), and a wireless network such as wireless LANs, CDMA, Bluetooth, and satellite communication, but the scope of the present disclosure is not limited thereto.

Figure 2:
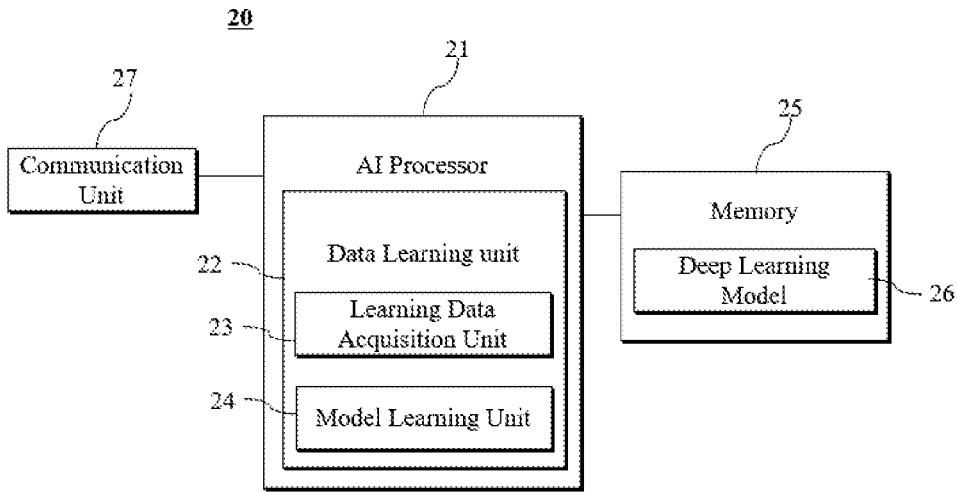
FIG. 2 is a diagram for explaining an AI device (module) applied to training an object recognition model according to one embodiment of the present disclosure.

FIG. 2 is a diagram for explaining an AI (artificial intelligence) device (module) applied to training of the object recognition model according to one embodiment of the present disclosure.

Embodiments of the present disclosure may be implemented through a computing device for training a model for object recognition, and the computing device may include the image management server 200 (see FIG. 1) described in FIG. 1, but the present disclosure is not limited thereto, and a dedicated device for training an AI model for recognizing an object in an image may also be included. The dedicated device may be implemented in the form of a software module or hardware module executed by a processor, or in the form of a combination of a software module and a hardware module.

Hereinafter, the dedicated AI device 20 for implementing the object recognition learning model will be described in FIG. 2, and a block configuration for implementing an object recognition learning model according to one embodiment of the present disclosure in the image management server 200 (see FIG. 1) will be described in FIG. 3. All or at least some of the functions common to the model training function described in FIG. 2 may be directly applied to FIG. 3, and in describing FIG. 3, redundant descriptions of functions common to FIG. 2 will be omitted.

Referring to FIG. 2, the AI device 20 may include an electronic device including an AI module capable of performing AI processing, or a server including an AI module. In addition, the AI device 20 may be included the image capture device 100 or the image management server 200 as at least a part thereof to perform at least a part of AI processing together.

The AI processing may include all operations related to a control unit of the image capture device 100 or the image management server 200. For example, the image capture device 100 or the image management server 200 may AI-process the obtained image signal to perform processing/determination and control signal generation operations.

The AI device 20 may be a client device that directly uses the AI processing result or a device in a cloud environment that provides the AI processing result to other devices. The AI device 20 is a computing device capable of learning a neural network, and may be implemented in various electronic devices such as a server, a desktop PC, a notebook PC, and a tablet PC.

The AI device 20 may include an AI processor 21, a memory 25, and/or a communication unit 27.

Here, the neural network for recognizing data related to image capture device (100) may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquisition unit 23 may acquire learning data required for a neural network model for classifying and recognizing data. According to one embodiment of the present disclosure, the learning data may include information on object of interest designated by a user in an image captured by the image capture device, and information on object of non-interest selected from a region excluding the object of interest in the image. The information on object of interest may include location information of the object of interest in the image. The location information may include coordinate information of a bounding box of the object of interest. The coordinate information may include vertex coordinates and center coordinates of the bounding box. Meanwhile, the object of non-interest in the learning data may be randomly designated by the processor or selected based on a predetermined criterion.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

According to one embodiment of the present disclosure, in case where an object that is not designated as an object of interest as a result of learning based on the learning data is recognized as an object of interest, the model training unit 24 may determine it as an erroneously detected object to change the erroneously detected object to an object of non-interest, and then may apply it to the model retraining process.

Meanwhile, in the present disclosure, the erroneously detected object may be used for training or re-training in order to minimize erroneous detection in the object recognition process. In addition, the product to which the object recognition technology of the present disclosure is applied may be applied to a surveillance camera, and in particular, in the case of a personal surveillance camera, the types and number of objects of interest may be restrictive. Accordingly, based on the fact that the types and amount of learning data may be limited, a meta-learning method that minimizes the use of learning data may be applied. Meta-learning is a methodology that enables machines to learn rules (meta-knowledge) on their own by automating the machine learning process which was controlled by humans.

As a field of meta-learning, few-shot learning is a method of learning how similar (or different) given data is to other data. The few-shot learning with a very small number of data may include training data and test data (query data), and such a few-shot learning task is called 'N-way K-shot'. Here, N may mean a category (class), and K may mean the number of training data for each class. In addition, as K, the number of shots, increases, the predictive performance (accuracy of inference) of data may increase, and few-shot learning may mean model learning in a situation where K is small. In one embodiment of the present disclosure, since the number of objects of interest specified by the user is restrictive, the erroneously detected object recognition algorithm may be learned through few-shot learning. When the neural network model is trained, the model training unit 24 may store the trained neural network model in a memory. The model training unit 24 may store the trained neural network model in the memory of the server connected to the AI device 20 through a wired or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

According to one embodiment of the present disclosure, when an erroneously detected object is found as a result of performing an object detection operation based on the trained model, the model evaluator may convert the erroneously detected object into an object of non-interest to retrain the model.

The communication unit 27 may transmit the AI processing result of the AI processor 21 to an external electronic device. For example, the external electronic device may include a surveillance camera, a Bluetooth device, an autonomous vehicle, a robot, a drone, an AR (augmented reality) device, a mobile device, a home appliance, and the like.

Meanwhile, the AI device 20 shown in FIG. 2 has been functionally divided into the AI processor 21, the memory 25, the communication unit 27, and the like, but the above-described components are integrated as one module and it may also be called an AI module.

In the present disclosure, at least one of a surveillance camera, an autonomous vehicle, a user terminal, and a server may be linked to an AI module, a robot, an augmented reality (AR) device, a virtual reality (VR) device, a device related to a 5G service, and the like.

Figure 3:
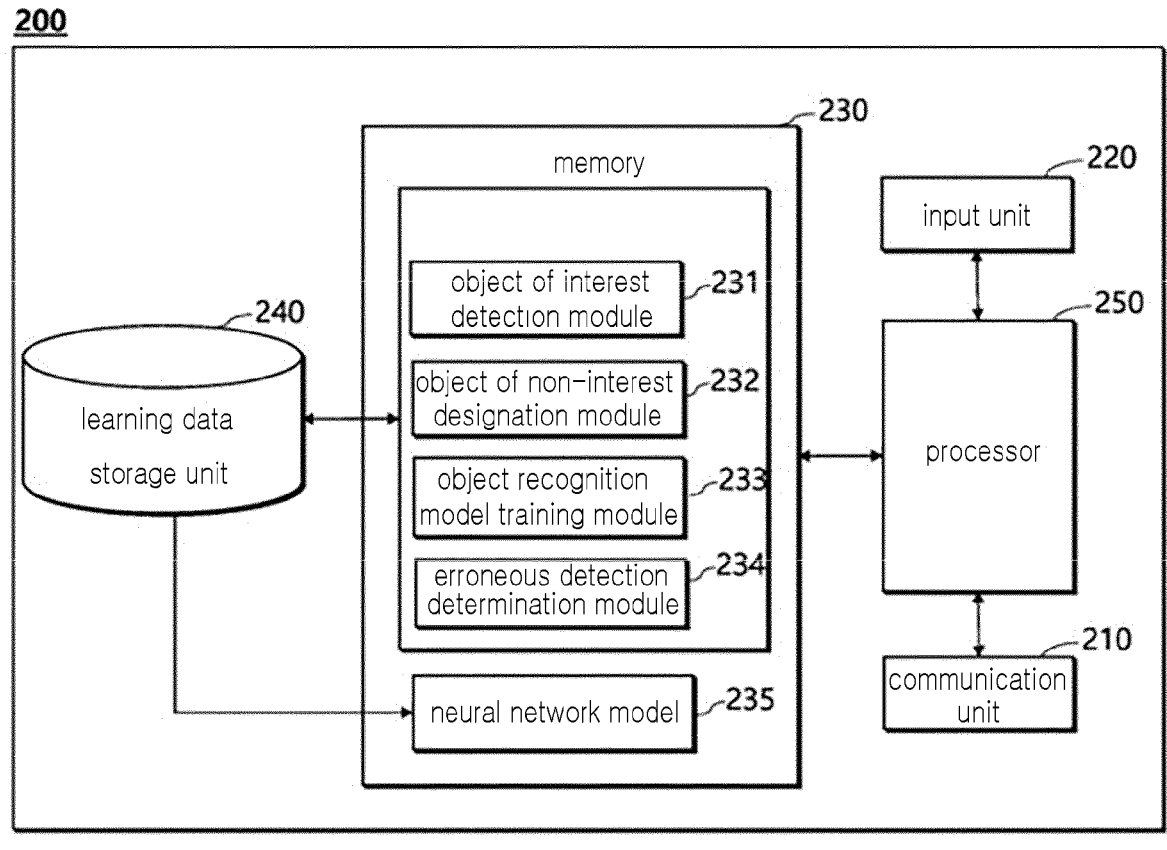
FIG. 3 is a diagram for explaining a computing device for training the object recognition model according to one embodiment of the present disclosure.

FIG. 3 is a diagram for explaining the computing device for training the object recognition model according to one embodiment of the present disclosure.

The computing device 200 is a device for processing an image acquired through the image capture device 100 (see FIG. 1) or the communication unit 210 and performing various calculations. According to one embodiment of the present disclosure, the computing device 200 illustrated in FIG. 1 may correspond to the image management server 200. However, the computing device 200 is not limited thereto, and may be at least one of a smartphone, a tablet PC (personal computer), a mobile phone, a video phone, an e-book reader, a desktop PC, a laptop PC, a netbook computer, a workstation, a PDA (personal digital assistant), a PMP (portable multimedia player), an MP3 player, a mobile medical device, a wearable device, and an IP camera.

Referring to FIG. 3, the computing device 200 may include a communication unit 210, an input unit 220, a memory 230, a learning data storage unit 240, and a processor 250.

The communication unit 210 is configured to transmit and receive data between the computing device 200 and another electronic device. The communication unit 210 may receive an image from the image capture device, train the object recognition learning model, and transmit it to the image capture device. For example, the communication unit 210 may perform data communication with a server or another device using at least one of wired/wireless communication methods including Ethernet, a wired/wireless local area network (LAN), Wi-Fi, Wi-Fi Direct (WFD), and wireless Gigabit Alliance (WiGig).

The input unit 200 may include a user input unit, and according to one embodiment of the present disclosure, may receive an input for designating an object of interest in an image as a learning target through the user input unit. The user input unit may include a key input unit, a touch screen provided in a display, and the like. When receiving an input for selecting an object of interest in an image displayed on the touch screen, the processor may designate the corresponding object as the object of interest. The processor may store location information of the object of interest by extracting location information of the object input to the touch screen.

For example, the memory 230 may include at least one of a flash memory type, a hard disk type, a multimedia card micro type, and a card type of memory (e.g., SD or XD memory etc.), RAM (Random Access Memory, SRAM (Static Random Access Memory), ROM (Read-Only Memory), EEPROM (Electrically Erasable Programmable Read-Only Memory), PROM (Programmable Read-Only Memory), a magnetic memory, a magnetic disk, and an optical disk.

The memory 230 may store a program including instructions related to the performance of a function or operation capable of generating learning data from the image received from the image capture device through the communication unit 210, performing training of the object recognition model based on the generated learning data, and automatically processing an erroneously detected object in a model training process. Instructions, algorithms, data structures, and program codes stored in the memory 230 may be implemented in a programming or scripting language such as, for example, C, C++, Java, assembler, or the like.

The memory 230 may include various modules for managing learning data. The plurality of modules included in the memory means a unit for processing a function or operation performed by the processor 250, which may be implemented in software such as instructions or program codes.

The object recognition model training method described herein may be implemented by executing instructions or program codes of a program stored in the memory.

The learning data management module may include an object of interest detection module 231, an object of non-interest designation module 232, an object recognition model training module 233, and an erroneous detection determination module 234.

The object of interest detection module 231 detects a designated object of interest in an image captured by the image capture device through a preset input. The object of interest may mean an object of interest that the user wants to detect from the image. In the present disclosure, the object of interest may be referred to as a positive object. The object of interest may include any object to be detected through the image capture device, such as a person, an animal, a vehicle, or more specifically, a human face. The object of interest detection module 231 may display a bounding box with respect to a designated object, and extract location information of the object as a coordinate value of each corner of the bounding box. The location information of the object extracted by the object of interest detection module 231 may be stored in the learning data storage unit 241.

The processor 250 may detect an object of interest from a pre-prepared image by executing instructions or program codes related to the object of interest detection module 231.

The object of non-interest detection module 232 may generate an object of non-interest by designating at least a portion of a region excluding the object of interest in the image. The object of non-interest may refer to all objects except for the designated object of interest. However, there may be a case in which an object not designated as the object of interest is recognized as the object of interest while object recognition is performed based on the trained model. In this case, since the reliability of the trained model is lowered, when objects of non-interest are designated as independent learning data as negative objects and used for training of the object recognition model, the recognition rate of the object of interest using the model can be increased.

In the present disclosure, the object of non-interest designation module 232 may randomly generate an object of non-interest or generate an object of non-interest based on a predetermined criterion to utilize it as learning data together with a pre-designated object of interest. The object of non-interest data generated through the object of non-interest designation module 232 may be stored in the learning data storage unit 240. Meanwhile, the object of non-interest designation module 232 may perform an operation of additionally designating an erroneously detected object as an object of non-interest while performing an object recognition operation through the trained model. That is, in one embodiment of the present disclosure, the object of non-interest may be generated before starting the training of the object recognition model (in a learning data preparation process) or may be additionally designated during the model training process. Here, the object of non-interest additionally designated during the model training process may include an object that is an erroneously detected object converted to an object of non-interest, or an object that is not the erroneously detected object, but is added as an object of non-interest based on the confidence score of the pre-trained model.

The object of non-interest designation module 232 may generate N number of sets of objects of non-interest having different attributes. Here, the N number of sets of objects of non-interest may include a first set of objects of non-interest randomly designated by the processor 250 in a region excluding the object of interest. In addition, the N number of sets of objects of non-interest may include a plurality of second sets of objects of non-interest generated by generating grid regions in which an image is divided at a predetermined interval and changing the grid interval in a grid region excluding the designated object of interest among the grid regions. For example, the processor 250 may divide an image at a first grid interval to generate an object of non-interest, and may designate a plurality of specific unit cells in a region excluding the object of interest. Alternatively, the processor 250 may designate a plurality of combination cells in which the unit grids are combined. Here, the selected cell may mean a pixel unit cell in the image or a unit grid divided in the entire image area.

The processor 250 may select a specific unit cell or a specific combination cell in the process of designating at least one object of non-interest region in the grid regions, and then select adjacent cells as object of non-interest regions based on a predetermined distance from the selected cell.

The processor 250 may generate an object of non-interest from a pre-prepared image by executing instructions or program codes related to the object of non-interest detection module 232.

The object recognition model training module 233 may train the artificial neural network model based on the object of non-interest and the object of interest stored in the learning data storage unit 240. The object recognition model training module 233 may repeatedly perform training in order to reflect the erroneous detection result.

According to one embodiment, the object recognition model training module 233 may train the object recognition model based on a designated object of interest and an object of non-interest randomly selected in a region excluding the object of interest region in the image. The object recognition model training module 233 may determine whether an erroneously detected object exists as a result of performing an object recognition operation based on the trained model. The object recognition model training module 233 may automatically change the erroneously detected object to an object of non-interest. The object recognition model training module 233 may retrain the object recognition model using the object of interest, the randomly designated object of non-interest, and the later changed object of non-interest as learning data.

In addition, according to one embodiment, the object recognition model training module 233 may train the object recognition model in a state in which only information on the object of interest is acquired before the initial training starts. When an erroneously detected object is detected by performing an object recognition operation based on the trained model after performing a model training operation without information on object of non-interest, the object recognition model training module 233 may convert the erroneously detected object to an object of non-interest and re-train the model.

The object recognition model trained through the object recognition model training module 233 may be configured as a neural network model 235 and stored in a memory.

In addition, according to one embodiment, the object recognition model training module 233 may generate a plurality of sets of objects of non-interest while changing the grid interval after dividing the designated object of interest image into grids of a predetermined interval. When the plurality of sets of object of non-interest are five sets, the object recognition model training module 233 may train and generate a total of five object recognition models. Since the five trained object recognition models have different types of objects of non-interest used as learning data, the reliability of the object recognition models may also be different. Accordingly, the object recognition model training module 233 may select any one of the plurality of different object recognition models and configure it as a neural network model. The object recognition model training module 233 may generate a validation set based on the learning data to select any one of the five models as an object recognition model and configure it as a neural network model.

The processor 250 may train the object recognition model by executing instructions or program codes related to the object recognition model training module 233.

The neural network model 235 is an AI model obtained by performing training using stored learning data. In one embodiment, the neural network model 235 may include model parameters obtained through training performed before performing the object recognition operation. Here, the model parameter may include a weight and a bias with respect to a plurality of layers included in the neural network model. The previously learned model parameter may be obtained by performing supervised learning in which a plurality of original images are applied as input and a label on information on an object of interest designated in the plurality of original images is applied as a groundtruth. A specific embodiment of processing the erroneously detected object to increase the recognition rate of the object of interest with respect to each of the plurality of original images is as described in the object of non-interest designation module 232, and will be described in more detail with reference to FIGS. 5 to 9 below.

Meanwhile, the object recognition model trained according to one embodiment of the present disclosure is applied with a machine learning-based object detection algorithm learned as an object of interest in an image obtained through a surveillance camera system.

Meanwhile, according to one embodiment of the present disclosure, a method learned in a process of detecting an erroneously detected object based on machine learning may also be applied in a process of implementing a deep learning-based training model. For example, the learning method applied to one embodiment of the present disclosure may be applied to a process of implementing a YOLO (You Only Lock Once) algorithm. YOLO is an AI algorithm suitable for surveillance cameras that process real-time videos because of its fast object detection speed. Unlike other object-based algorithms (Faster R-CNN, R_FCN, FPN-FRCN, etc.), the YOLO algorithm outputs a bounding box indicating the position of each object and the classification probability of what the object is as a result of resizing a single input image and passing it through a single neural network only once. Finally, one object is detected once through non-max suppression. Meanwhile, the learning method of the object recognition model disclosed in the present disclosure is not limited to the above-described YOLO and may be implemented by various deep learning algorithms.

The learning data storage unit 240 is a database for storing learning data generated by the object of interest detection module 231 and the object of non-interest designation module 232. In one embodiment, the learning data storage unit 240 may be configured as a nonvolatile memory. Non-volatile memory refers to a storage medium in which information is stored and maintained even when power is not supplied, and the stored information can be used again when power is supplied. The learning data storage unit 240 may include, for example, at least one of a flash memory, a hard disk, a solid state drive (SSD), a multimedia card micro type or a card type of memory (e.g., SD or XD memory), a read only memory (ROM), a magnetic memory, a magnetic disk, and an optical disk.

In FIG. 3, the learning data storage unit 240 is illustrated as a separate component other than the memory 230 of the computing device 200, but is not limited thereto. In one embodiment, the learning data storage unit 240 may be included in the memory 230. Alternatively, the learning data storage unit 240 is a component not included in the computing device 200 and may be connected through wired/wireless communication with the communication unit 210.

Figure 4:
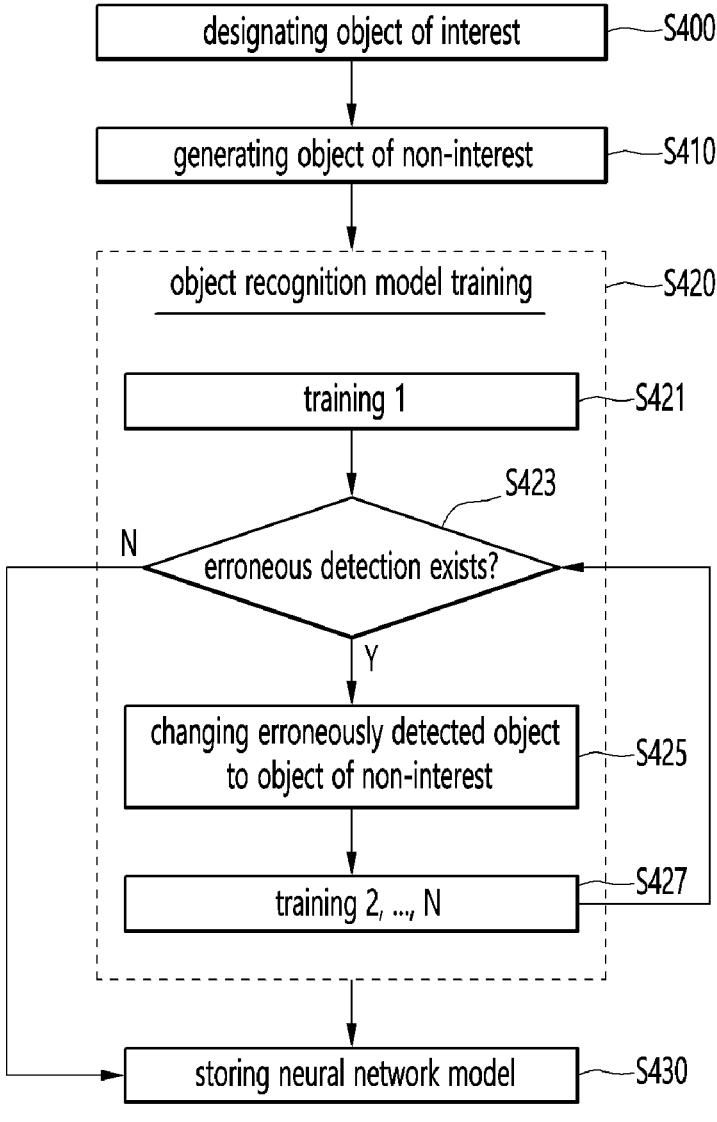
FIG. 4 is a flowchart of a method for training the object recognition model according to one embodiment of the present disclosure.
Figure 6A:
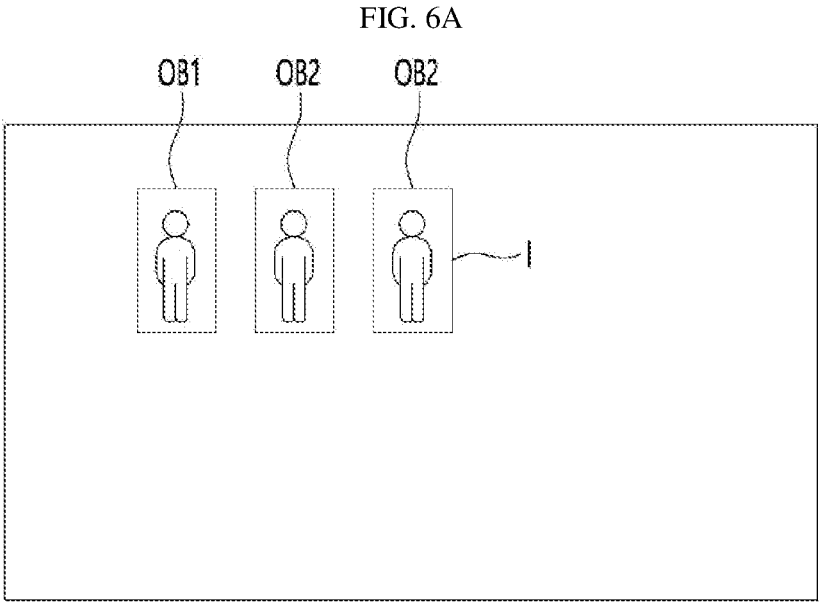
FIGS. 6A and 6B are diagrams for explaining an example of generating learning data of the object recognition model according to one embodiment of the present disclosure.
Figure 6B:
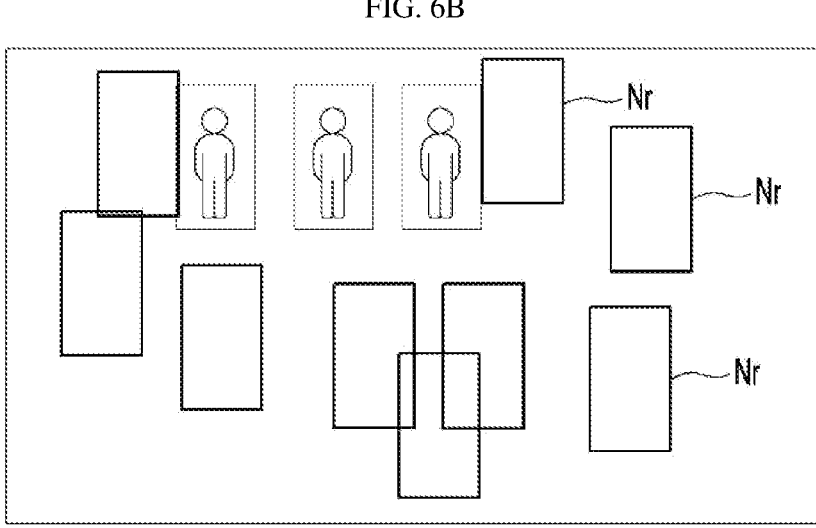

FIG. 4 is a flowchart of a method for training the object recognition model according to one embodiment of the present disclosure. FIGS. 6A and 6B are diagrams for explaining an example of generating learning data of the object recognition model according to one embodiment of the present disclosure. The object recognition model training method may be performed by the processor 250 of the computing device 200 which executes instructions or program codes related to the object detection module 231, the object of non-interest designation module 232, the object recognition model training module 233, and the erroneous detection determination module 234. Hereinafter, for convenience of description, the object recognition model training method will be described as being implemented through the processor 250.

Referring to FIGS. 4, 6A and 6B, the processor 250 may receive an input for designating an object of interest in an image acquired through a camera (S400). The computing device 200 may include a display associated with an input device, and the processor 250 may receive a user input for designating an object of interest through the input device. The processor 250 may display bounding boxes I with respect to objects of interest OB1, OB2, and OB3 selected as the user input is received, and extract location information (coordinate information) of the bounding boxes (see FIG. 6A).

The processor 250 may generate an object of non-interest by designating at least a portion of a region excluding the object of interest in the image (S410). As shown in FIG. 6B, the processor 250 may generate a plurality of objects of non-interest Nr. However, although FIG. 6B displays a bounding box of the object of non-interest Nr for convenience of explanation, the computing device 200 may not display the generated object of non-interest on the display so as to be visually differentiated. The generation of the object of non-interest may refer to the operation of the object of non-interest designation module 232 in FIG. 3.

The processor 250 may train an object recognition model by using the object of interest and the object of non-interest as learning data (S420).

According to one embodiment, the processor 250 may perform the first training using the previously prepared learning data (S421). The processor 250 may perform an object operation using the first trained model.

The processor 250 may determine whether erroneous detection exists as a result of the object recognition (S423). The erroneously detected object may mean a case in which an object not designated as an object of interest is recognized as a result of performing an object recognition operation by applying the trained object recognition model.

According to one embodiment, the processor 250 may determine whether erroneous detection is detected by calculating an overlap ratio of a pre-designated object of interest and an object recognized as a result of performing the object recognition operation. The processor 250 may calculate the overlap ratio between the object of interest and the object recognized as a result of performing the object recognition operation by using an intersection over union (IoU) method.

According to one embodiment, the processor 250 may calculate a similarity between the object of interest and the object recognized as a result of the object recognition operation. The processor 250 may calculate a similarity indicating a correlation between a first feature vector of the object of interest and a second feature vector of the recognized object as a result of the object recognition operation as a numerical value. The processor 250 may check whether erroneous detection is detected depending on the similarity.

According to one embodiment, the processor 250 may determine whether the object of interest is normally recognized based on the overlap ratio and the similarity.

When it is determined that the erroneously detected object exists (Yin S423), the processor 250 may change the erroneously detected object to an object of non-interest (S425). According to one embodiment, the processor 250 may execute instructions or program codes for designating the erroneously detected object as an object of non-interest in a state not indicated on the display of the computing device so that the user may check whether the erroneously detected object exists or not and/or conversion status to the object of non-interest.

The processor 250 may retrain the object recognition model by using the object changed from the erroneously detected object to the object of non-interest as learning data (S427).

The processor 250 may repeatedly perform steps S421, S423, and S427 and, when erroneous detection does not exist (N in S423), may end training and store the trained model as a neural network model (S430).

In the repeated training process, the processor 250 may automatically extract erroneous detection location information based on the previously trained model and change it to an object of non-interest.

In addition, the processor 250 may select an object of non-interest that is helpful for training based on the previously trained model in the repeated training process. According to one embodiment, the processor 250 may select an object of non-interest based on the confidence score of the previously trained model.

Hereinafter, a process of generating an object of non-interest will be described in more detail with reference to FIGS. 5, 7A, 7B, 8A and 8B.

Figure 5:
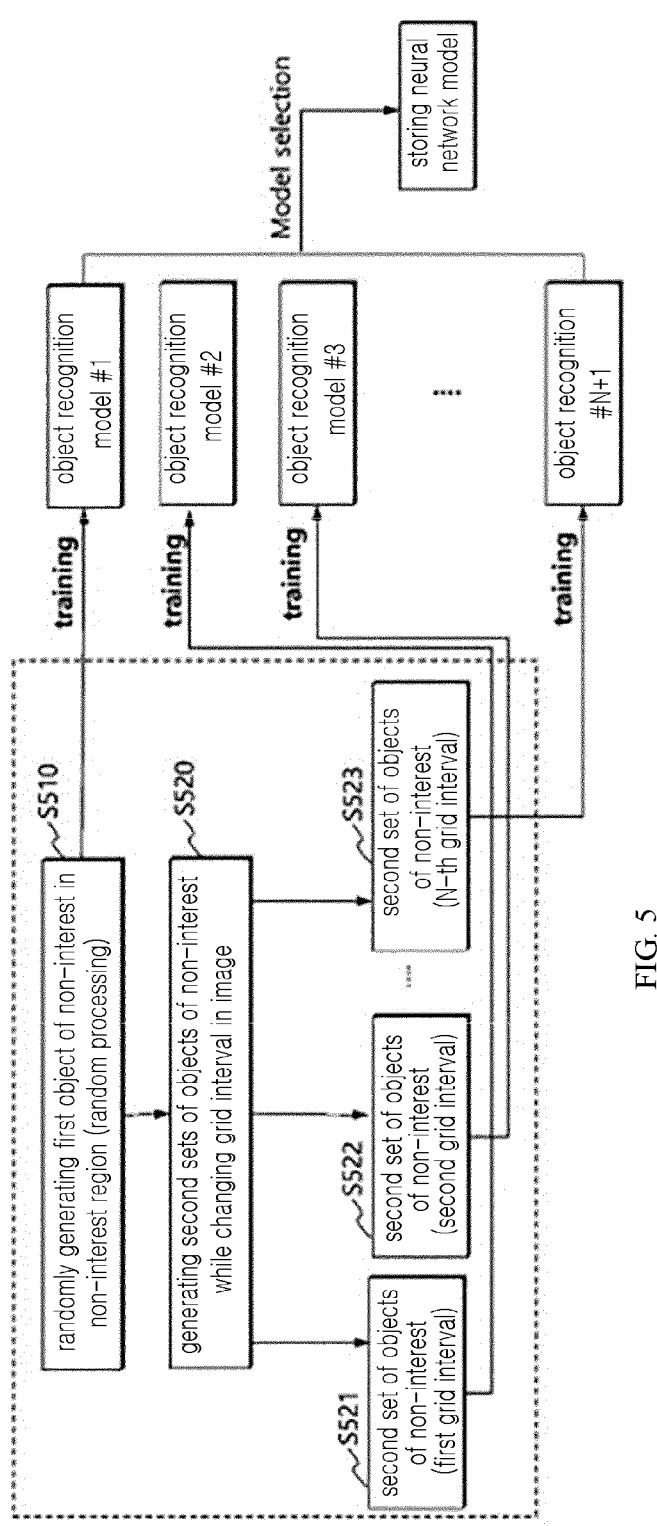
FIG. 5 is a diagram for explaining a process of using an object of non-interest as learning data in a training process of the object recognition model according to one embodiment of the present disclosure.

FIG. 5 is a diagram for explaining a process of using an object of non-interest as learning data in a training process of the object recognition model according to one embodiment of the present disclosure. FIGS. 7A, 7B, 8A and 8B are diagrams for explaining an example of a process of generating an object of non-interest from among the learning data in FIGS. 6A and 6B.

Referring to FIG. 5, the processor 250 may randomly generate a first object of non-interest in a region of non-interest excluding the object of interest in an image after the object of interest is designated (S510). The processor 250 may train the first object recognition model using the pre-designated object of interest and the first object of non-interest as learning data.

The processor 250 may generate a plurality of second sets of objects of non-interest while changing the grid interval (S520).

Figure 7A:
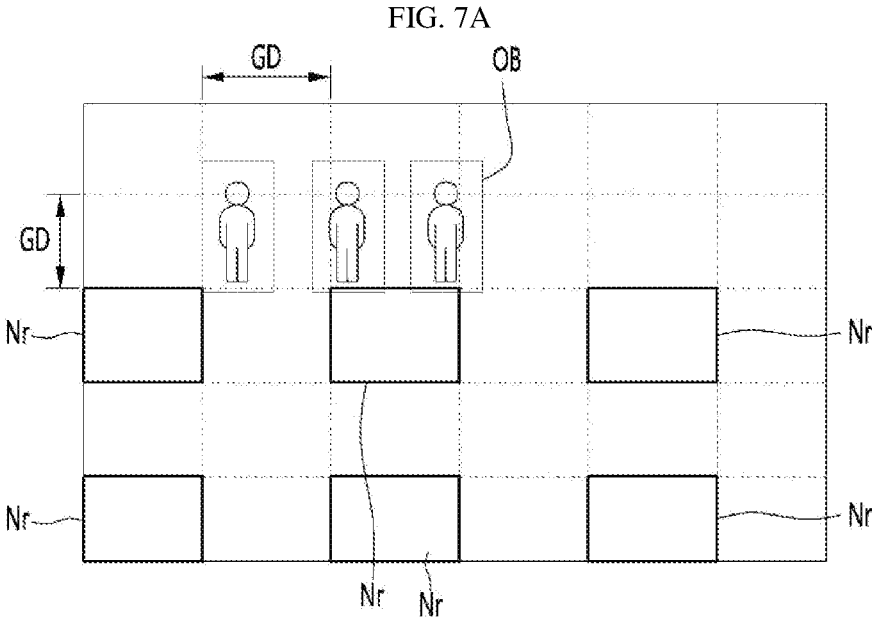
FIGS. 7A, 7B, 8A and 8B are diagrams for explaining an example of a process of generating an object of non-interest among the learning data in FIGS. 6A and 6B.
Figure 7B:
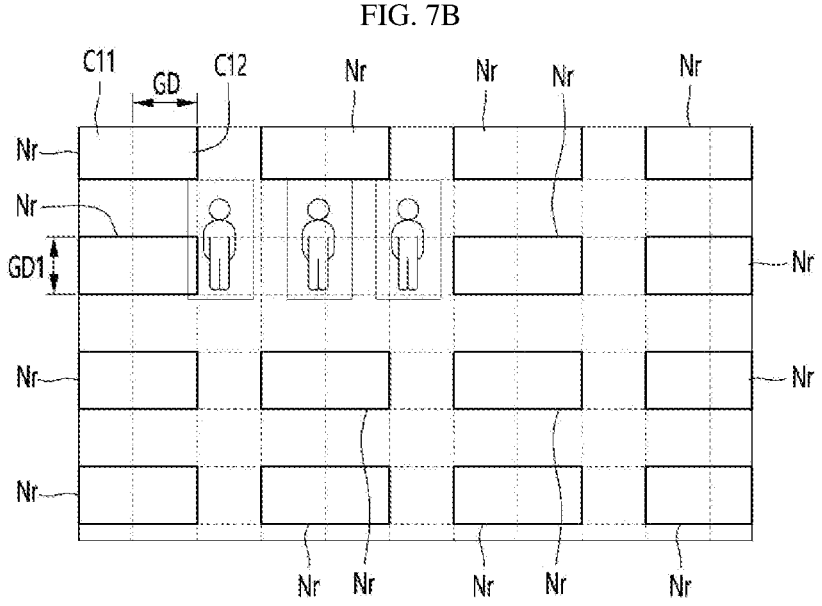

Referring to FIGS. 7A and 7B, the processor 250 may divide an image into grids having a predetermined grid distance GD. The processor 250 may randomly set specific cells as an object of non-interest region Nr in a region excluding the objects of interest OB in a state where the objects of interest OB are designated (see FIG. 7A). Hereinafter, in FIGS. 7A to 8B, a size of the bounding box Nr corresponding to the object of non-interest region selected as the grid interval is adjusted is displayed to correspond to a size of the grid interval, but the present disclosure is not limited thereto. For example, the size of the bounding box Nr of the object of non-interest may be set to be equal to the size of the bounding box of the object of interest OB and displayed. In addition, according to one embodiment, the processor configures a new object of non-interest region by combining a plurality of object of non-interest regions, and a new bounding box corresponding to the configured object of non-interest region may be displayed.

According to one embodiment, the processor 250 may change the grid interval from GD to a first grid interval GD1, and select a unit cell generated by a combination of specific cells C11 and C12 in the changed grid region as a non-interest region Nr (S521). The processor 250 may designate non-interest regions Nr based on a predetermined distance (e.g., one cell) in the entire image region in a state in which the unit cell Nr is set (FIG. 7B). The processor 250 may train the second object recognition model by using the pre-designated object of interest and a second set of objects of non-interest generated in the first grid interval state as learning data.

Figure 8A:
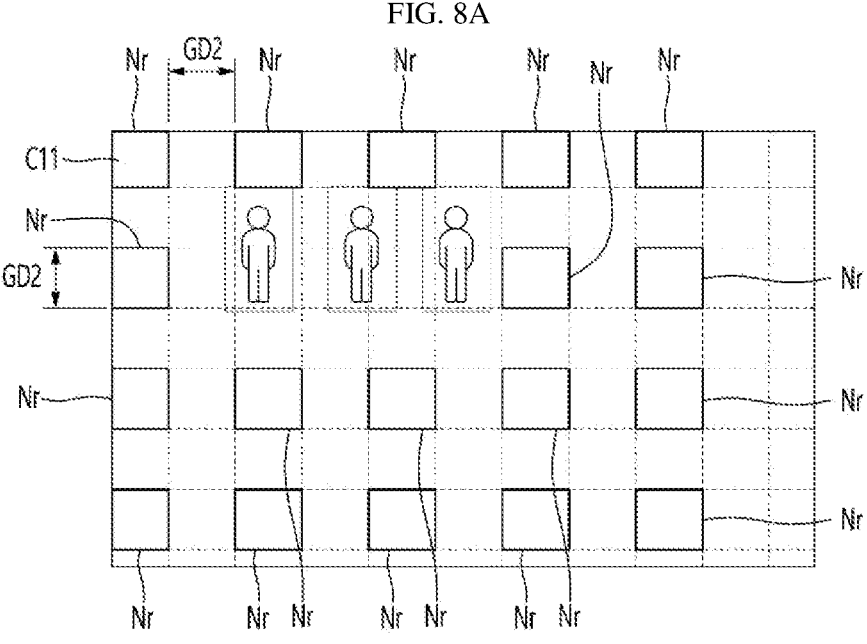
Figure 8B:
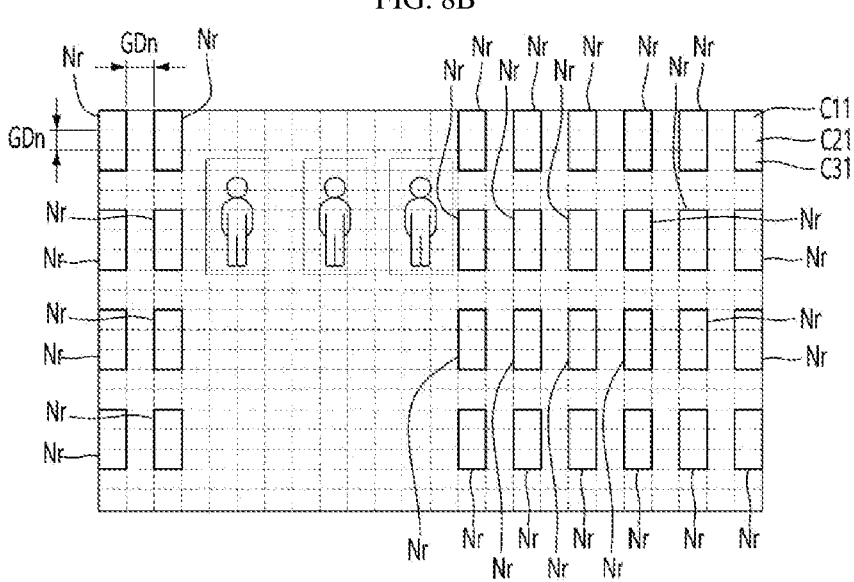

Referring to FIGS. 8A and 8B, according to one embodiment, the processor 250 may change the grid interval to a second grid interval GD2, define a specific cell C11 as a unit cell in the changed grid region, and select the unit cell as a non-interest region Nr (S522). The processor 250 may generate a second object of non-interest set in the second grid interval state by designating non-interest regions Nr based on a predetermined distance (for example, one cell) in the entire image region in a state in which the unit cell Nr is set (FIG. 8A). The processor 250 may train the third object recognition model by using the pre-designated object of interest and the second set of objects of non-interest generated in the second grid interval state as learning data.

According to one embodiment, the processor 250 may change the grid interval to an n-th grid interval GDn, define a combination C11, C21, and C31 of specific cells in the changed grid region as a unit cell, and select the unit cell as a non-interest region Nr (S523). In the state in which the unit cell Nr is set, the processor 250 may generate an n-th set of objects of non-interest in the n-th grid interval state by designating non-interest regions Nr based on a certain distance (e.g., one cell interval in the X-axis direction, two cell intervals in the Y-axis direction) in the entire image region (FIG. 8B). The processor 250 may train the (n+1)-th object recognition model using the pre-designated object of interest and the n-th set of objects of non-interest generated in the n-th grid interval state as learning data.

Referring back to FIG. 5, the processor 250 may select a model having the highest reliability among a plurality of object recognition models (object recognition model #1, object recognition model #2, object recognition model #3, and object recognition model #n) trained based on a plurality sets of objects of non-interest and store the same as a neural network model. According to one embodiment, the processor 250 may generate a validation set based on the previously prepared learning data, and may select a model having the highest reliability among N number of object recognition models based on the verification set.

Meanwhile, in FIG. 5, although a process of generating the different sets of objects of non-interest while the processor 250 changes the grid interval of the image N times has been described, N may be flexibly selected by the processor 250 in the process of training the object recognition model. When the confidence score of the object recognition model based on the set of objects of non-interest generated in the first grid interval state is equal to or greater than a predetermined threshold, the processor 250 may end generation of the set of objects of non-interest. That is, the processor 250 may adjust the number of generation of the set of objects of non-interest until the object recognition learning model that reaches the predetermined confidence score value is implemented.

In one embodiment of the present disclosure, training N number of object recognition models by generating N number of sets of objects of non-interest cannot completely eliminate the uncertainty of object of non-interest selection even if the object of non-interest is randomly designated by the processor or the object of non-interest is designated while the processor changes a predetermined grid interval. The sets of objects of non-interest randomly designated by the processor may have limitations in reducing the probability of erroneous detection. Accordingly, the present disclosure can increase the reliability of the object recognition model through a process of independently training an object recognition model based on the sets of objects of non-interest having different attributes, and selecting an optimal model based on a validation set.

Figure 9:
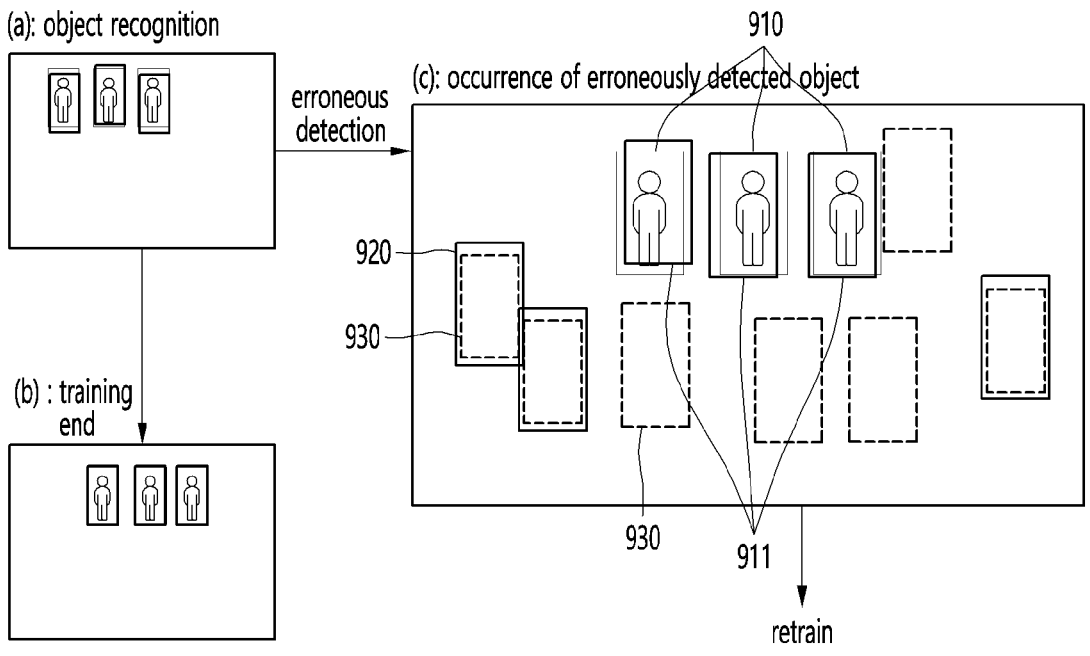
FIG. 9 is a diagram for explaining an example of processing an erroneously detected object in the training process of the object recognition model according to one embodiment of the present disclosure.

FIG. 9 is a diagram for explaining an example of processing an erroneously detected object in the training process of the object recognition model according to one embodiment of the present disclosure.

Referring to FIG. 9, the processor 250 may perform an object recognition operation based on the previously trained object recognition model. As a result of object recognition, when the designated object of interest 910 is normally recognized, the processor 250 may index the recognized object positively ((a) in FIG. 9).

When it is confirmed that any erroneously detected object does not exist as a result of object recognition, the processor 250 may end the model training ((b) in FIG. 9).

When an object 920 recognized as a positive exists in a region excluding the designated object of interest although the object 910 is normally recognized as a result of object recognition, the processor 250 may change the object 920 to a negative. In addition, the processor 250 may retrain the object recognition model by reflecting the object changed to the negative.

Although, for convenience of explanation, a configuration in which the erroneously detected object 920 is changed to the negative has been visualized and described in FIG. 9, according to one embodiment of the present disclosure, by executing the instructions or program codes that automatically change the erroneously detected object to negative and performs indexing, the processor may automatically perform a feedback process on the erroneously detected object during the training process to alleviate the inconvenience of the user having to manually correct the erroneously detected object.

According to another embodiment of the present disclosure, in the process of repeatedly learning one image, the computing device may reflect erroneous detection results for each learning in the next learning to train an object recognition model capable of increasing the object recognition rate.

The processor 250 may designate an object of interest in a first image obtained through the camera based on a user input through the input unit. The processor 250 may extract location information of the object of interest designated by the user and input (or apply) it to the object recognition model. The processor 250 automatically performs iterative learning based on the location information of the object of interest in order to train the object recognition model.

The processor 250 may randomly generate location information of an object of non-interest in the first image and apply the generated location information to the object recognition model to perform first learning. In this case, the randomly generated information on the object of non-interest may include an arbitrary object in a region excluding the object of interest selected by the user in the first image. The arbitrary object may be set in advance so that a previously set object is selected as an object of non-interest according to the type, size, and property of the object.

The processor 250 may additionally perform learning N times after the first learning, and, in each learning, may automatically extract location information of erroneously detected objects based on the previous learning result and change them to objects of non-interest. In this case, the first learning may mean learning performed first after the object of interest is designated by the user. Accordingly, in the case of the first learning, all of the learning data may be location information of the object of interest.

The processor 250 may perform an object recognition operation on the first image based on the object recognition model prepared according to the first learning. As a result of the object recognition operation, the processor 250 may sense a case in which an object not designated by the user is detected (false positive). In this case, the processor 250 may automatically change the false positive to an object of non-interest (negative), and use the location information of the object of non-interest as learning data for re-training the object recognition model according to the first learning result. The processor 250 may manage an iterative learning process so that the re-training process is repeated until the N-th learning. The N-th learning means a case where no erroneous detection occurs as a result of performing the object recognition operation on the first image based on the object recognition model according to the N-th learning. That is, the processor 250 may repeatedly control the re-training to proceed until no erroneous detection occurs as a result of applying the trained object recognition model after training the object recognition model, while reflecting the erroneous detection results in the re-training.

The processor 250 may apply coordinate information of a bounding box of an object of interest designated through the user input in the first image to the object recognition model.

The processor 250 may change the visual characteristics of the object of interest detected in the process of performing the iterative learning and display it on the display unit, and may apply location information of the erroneously detected object in the next iterative learning while the erroneously detected object is not displayed through the display unit.

The processor 250 may determine whether the erroneously detected object exists according to an intersection over union (IoU) value of an object of interest designated through a user input and an object recognition result of the trained object recognition model.

The present disclosure described above can be implemented as computer-readable codes on a medium in which a program is recorded. The computer-readable medium includes all kinds of recording devices in which data readable by a computer system is stored. Examples of the computer-readable medium include a hard disk drive (HDD), a solid state disk (SSD), a silicon disk drive (SDD), ROM, RAM, CD-ROM, a magnetic tape, a floppy disk, and an optical data storage device, and other implementations in the form of carrier waves (e.g., transmission over the Internet). Therefore, the above detailed description should not be construed as limited in all respects but should be considered as exemplary. The scope of the present disclosure should be determined by reasonable interpretation of the appended claims, and all changes within the equivalent scope of the present disclosure are contained in the scope of the present disclosure.

What is claimed is:

1. An object recognition model training method in a computing device, the method comprising:

receiving an input for designating an object of interest in an image acquired through a camera, wherein the input for designating the object of interest is received as a user selects displayed objects in the image;

generating an object of non-interest by designating at least a portion of a region excluding the object of interest in the image;

training an object recognition model based on the object of interest and the object of non-interest;

when a first object not designated as the object of interest is recognized as a result of performing object recognition based on the trained object recognition model, changing the first object to the object of non-interest; and retraining the object recognition model based on the changed object of non-interest, wherein the generating of the object of non-interest includes generating N number of sets of objects of non-interest with different attributes, and wherein the N number of sets of objects of non-interest includes a first set of objects of non-interest randomly designated in the region excluding the object of interest by a processor of the computing device, and a plurality of second sets of objects of non-interest generated while, among grid regions obtained by dividing the image at a predetermined grid interval, changing the grid interval in the region excluding the object of interest.

2. The object recognition model training method of claim 1, wherein the receiving of the input for designating the object of interest includes extracting location information of the object of interest as the object of interest is designated.

3. The object recognition model training method of claim 1, wherein the plurality of second sets of objects of non-interest include a plurality of pixel regions designated in a state where the grid interval is adjusted to a first grid interval and a plurality of pixel regions designated in a state where the grid interval is adjusted to a second grid interval.

4. The object recognition model training method of claim 1, wherein in the training of the object recognition model, each of N number of object recognition models is trained using the object of interest and each of the N number of sets of objects of non-interest as a pair of learning data.

5. The object recognition model training method of claim 1, wherein in the generating of the object of non-interest, the object of non-interest is additionally designated when a confidence score in the region excluding the object of interest is similar to the object of interest within a predetermined range, based on the confidence score of a previous training model in a process of repeatedly performing the training of the object recognition model.

6. The object recognition model training method of claim 1, wherein the changing of the first object to the object of non-interest includes: acquiring object characteristic information of the first object; and selecting a second object to be changed to the object of non-interest based on the object characteristic information of the first object among objects not generated as the object of non-interest, and additionally changing the second object to the object of non-interest.

7. The object recognition model training method of claim 1, further comprising: changing and displaying a visual characteristic of a bounding box of the object changed to the object of non-interest.

8. A computing device comprising:

a communication unit that receives an image acquired through a camera;

a user input unit that designates an object of interest in the image;

a processor that generates an object of non-interest by designating at least a portion of a region excluding the object of interest in the image and trains an object recognition model based on the object of interest and the object of non-interest;

wherein, in case that a first object not designated as the object of interest is recognized as a result of performing object recognition based on the trained object recognition model, the processor changes the first object to the object of non-interest and retrains the object recognition model based on the changed object of non-interest, wherein the processor generates N number of sets of objects of non-interest with different attributes, and wherein the N number of sets of objects of non-interest includes a first set of objects of non-interest set randomly designated in the region excluding the object of interest by the processor of the computing device, and a plurality of second sets of objects of non-interest sets generated while, among grid regions obtained by dividing the image at a predetermined grid interval, changing the grid interval in the region excluding the object of interest.

9. The computing device of claim 8, wherein the processor extracts location information of a bounding box of the object of interest as the object of interest is designated.

10. The computing device of claim 8, wherein The processor generates a plurality of pixel regions designated in a state in which the grid interval is adjusted to a first grid interval, and a plurality of pixel regions designated in a state in which the grid interval is adjusted to a second grid interval as the second sets of objects of non-interest, respectively.

11. The computing device of claim 8, wherein the processor additionally designates the object of non-interest when a confidence score in the region excluding the object of interest is similar to the object of interest within a predetermined range based on the confidence score of a previous learning model in a process of repeatedly training the object recognition model.

12. The computing device of claim 8, wherein the processor acquires object characteristic information of the first object, selects a second object to be changed to the object of non-interest based on the object characteristic information of the first object among objects not generated as the object of non-interest, and additionally changes the second object to the object of non-interest.

13. A computing device comprising:

a communication unit that receives an image acquired through a camera;

a user input unit that receives a user selection of displayed objects in the image and designates an object of interest in the image in accordance with the user selection;

a processor that generates an object of non-interest by designating randomly selected portion of a region excluding the object of interest in the image and trains an object recognition model based on the object of interest and the object of non-interest;

wherein, in case that a first object not designated as the object of interest is recognized as a result of performing object recognition based on the trained object recognition model, the processor changes the first object to the object of non-interest and retrains the object recognition model based on the changed object of non-interest.

\* \* \* \* \*